H. F. LEISSNER.
COUPLING.
APPLICATION FILED MAR. 27, 1919.

1,315,848.

Patented Sept. 9, 1919.

INVENTOR
H. F. Leissner
by James J. Sheehy & Co.
ATTY'S.

UNITED STATES PATENT OFFICE.

HARRY FERDINAND LEISSNER, OF LJUSNE, SWEDEN.

COUPLING.

1,315,848.  Specification of Letters Patent.  Patented Sept. 9, 1919.

Application filed March 27, 1919. Serial No. 285,614.

*To all whom it may concern:*

Be it known that I, HARRY FERDINAND LEISSNER, a citizen of the Kingdom of Sweden, residing at Ljusne, Sweden, have invented new and useful Improvements in Couplings, of which the following is a specification.

In certain machineries it is of importance to turn a shaft, while in operation, relatively to the rest of the machinery, as for instance for obtaining a different direction of movement or a different operation of the machinery.

This invention has for its object to provide a coupling which enables such an adjustment of a shaft while in operation. This coupling is characterized, chiefly, in this that it consists of a closed casing and a piston mounted to turn therein within certain limits by the introduction of a pressure medium into the casing thereby moving the shafts connected together by the coupling through a certain angle with relation to one another.

Figure 1:
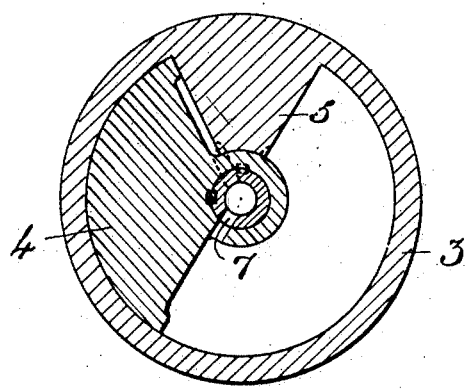
Figure 2:
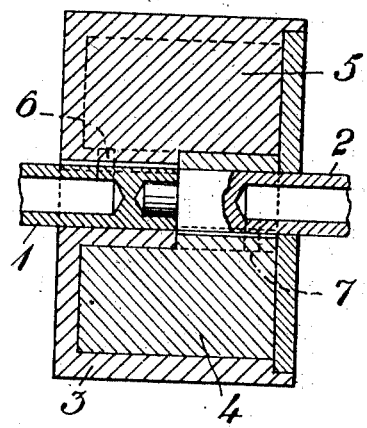

One embodiment of such a coupling is illustrated in the accompanying drawing. Figure 1 shows a cross section and Fig. 2 a longitudinal section of the coupling.

The coupling shown is adapted for the transfer of power from a shaft 1 to a shaft 2 which it is desirable to turn through a certain angle relatively to the shaft 1 while in operation.

The coupling shown consists of a cylindrical casing 3 attached to the shaft 1 and a piston 4 attached to the shaft 2 and mounted to turn in the casing 3. The casing 3 is formed with an inwardly extending projection 5, forming an abutment for the piston 4, which may be turned in the casing from the position in which it contacts with the one side of the projection 5 into the position in which it bears against the other side thereof. The projection 5 also forms a water or air-tight partition within the casing at one side of the hub thereof.

The adjustment of the piston 4 forming one member of the coupling, relatively to the casing 3 forming the other member of the coupling is effected by the introduction of a suitable pressure medium into the casing 3 between the piston 4 and the one side or the other of the abutment 5.

The pressure medium is supplied in the embodiment shown through the shafts 1 and 2 which are hollow and formed with lateral openings 6, 7 communicating with openings in the hub of the coupling members for leading the pressure medium to the one side or the other of the piston. By the introduction of a suitable pressure medium as for instance a gas or a liquid on the one side or the other of the piston 4, the piston and thus also the shaft 2 may be adjusted into any desired angular position relatively to the shaft 1 between the end positions determined by the side walls of the projection 5.

If the turning of the shaft 2 relatively to the shaft 1 has for its purpose to effect a change of the direction of movement of the machine from which the shaft 1 is driven, then it is desirable that the pressure medium will only effect a shifting of the piston from its one end position into its other end position so that in the operation of the coupling in the one direction of movement the one side wall of the abutment and in the operation of the coupling in the other direction of movement, the other side wall of the abutment 5 will bring the piston with it in order that the coupling needs not be maintained under the action of the pressure medium after the shifting operation has taken place.

What I claim as new and desire to secure by Letters Patent is:—

1. A coupling for shafts adapted to permit a positively controlled angular adjustment of the shafts with respect to each other when in operation, comprising a cylindrical casing, a piston mounted to turn in said casing, a partition in the casing for limiting the relative movements of the piston and the casing; said piston and said partition dividing the interior of the casing into two chambers without communication with one another, and means for introducing a fluid under pressure into one or the other of said chambers, for the purpose of effecting a desired relative turning movement of the piston and the casing.

2. A coupling for shafts, adapted to permit a positively controlled angular movement of the shafts with respect to each other when in operation, comprising a cylindrical casing attached to one of said shafts, a piston attached to the other of said shafts and mounted to turn in said casing, a partition for limiting the relative movements of the piston and the casing, said piston and said partition dividing the interior of the casing into two chambers, having no communication with one another, channels formed in said shafts and communicating each with one of said chambers for the introduction of fluid under pressure into one or the other of said chambers for the purpose of positively turning the shafts with respect to each other.

In testimony whereof I have signed my name.

HARRY FERDINAND LEISSNER.

Copies of this patent may be obtained for five cents each, by addressing the "Commissioner of Patents, Washington, D. C."